Jan. 22, 1952   G. CAWLEY ET AL   2,583,040
CORE TYPE WINDER DRIVE
Filed Feb. 4, 1950

INVENTORS
GEORGE CAWLEY
HOWARD M. BROWN
BY
Pennie, Edmonds, Morton and Barrows
ATTORNEYS Patented Jan. 22, 1952

2,583,040

UNITED STATES PATENT OFFICE 2,583,040

CORE TYPE WINDER DRIVE

George Cawley, Upper Montclair, and
Howard M. Brown, Wood-Ridge, N. J.

Application February 4, 1950, Serial No. 142,378

7 Claims. (Cl. 242—75)

This invention relates to winding machines employing a mandrel to wind material in strip or sheet form into rolls as in the manufacture of electric condensers, for example, and more particularly to a method and means for stopping the mandrel in a preferred angular orientation or orientations.

This application is a continuation-in-part of our copending application Serial No. 97,014, filed June 3, 1949. In the aforesaid copending appliaction we have disclosed an electrodynamic means for maintaining a constant tension in a sheet or strip of material wound up on a mandrel, regardless of the changing diameter of the roll of material wound on the mandrel. The present application is concerned with indexing means to hold the mandrel in a preferred angular orientation when stationary, as when a sheet or strip of material is to be threaded thereon for a new winding, and with means to stop the rotation of the mandrel when the winding of a core is complete.

Figure 1:
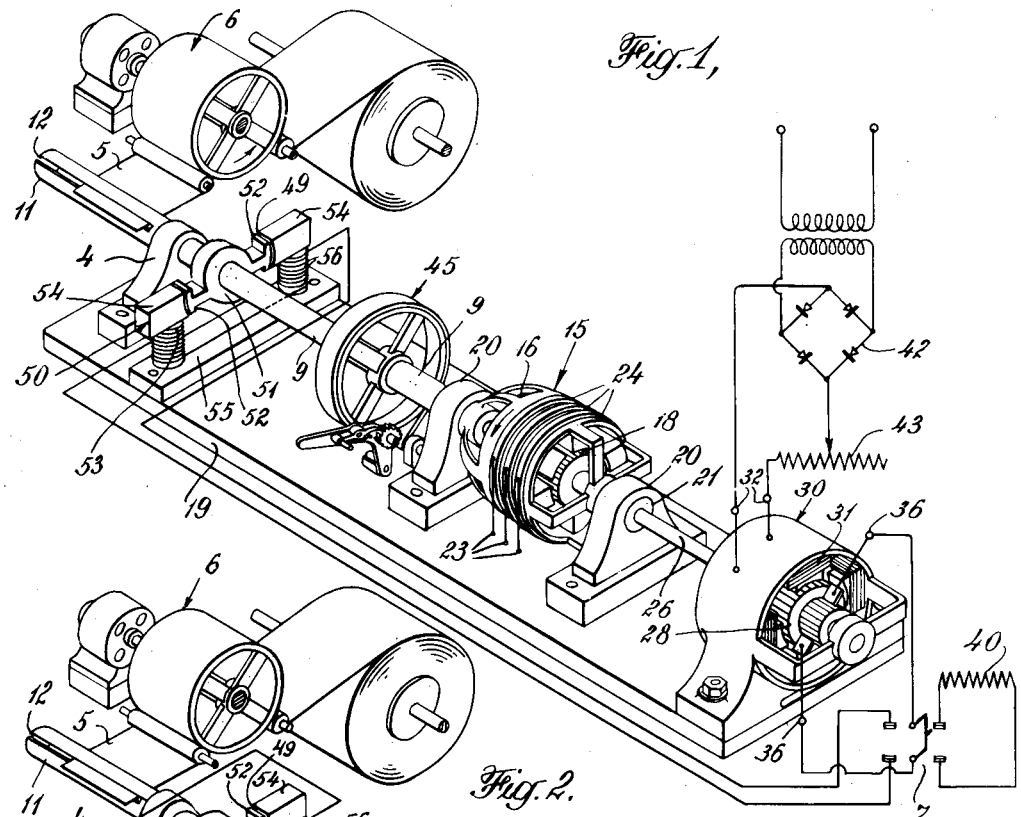

In the accompanying drawings Fig. 1 is a diagrammatic view of a winding machine according to our invention, including indexing means which, in conjunction with an associated brake, cause the mandrel to stop always in one of two angular positions 180° apart.

Figure 2:
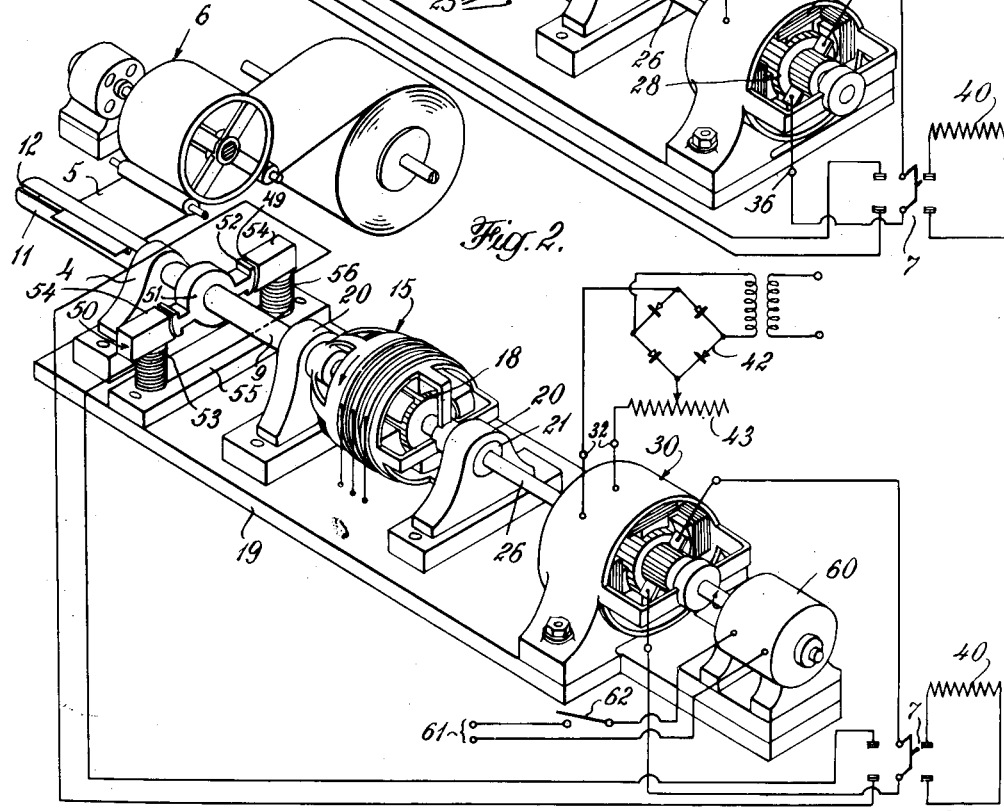

Fig. 2 is a diagrammatic representation of a winding machine according to our invention including in place of the friction brake of the embodiment of Fig. 1 a decelerating motor which serves to reduce the rotational speed of the mandrel to zero.

In Fig. 1 a mandrel 11 is mounted for rotation in a bearing 4. A drive motor generally indicated at 15 has its field member 16 coupled to the mandrel 11 by any conventional means such as the shaft 9. The drive motor 15 includes a field producing element 16 and an armature element 18, both of which are mounted for rotation with respect to each other and with respect to a base 19. Thus in the embodiment shown the field element 16 is mounted in bearings 20 affixed to the base and the armature element is mounted in bearings 21 forming part of the field element. Power is supplied to the field element 16 by conductors 23 making contact at slip rings 24. The armature element 18 is linked through a suitable shaft 26 or other mechanical coupling to the armature 28 of a generator generally indicated at 30. The generator has a fixed field winding 31 connected to terminals 32. Brushes connect the generator armature voltage to a set of terminals 36 connected to the blades of a double pole double throw switch 7. In one position the switch 7 applies the generator voltage to a load resistance 40, and in its other position it applies this voltage to the winding of an index magnet 50 further described below. The field winding 31 of the generator is supplied with direct current voltage at its terminals 32 from a suitable source 42, regulation being available at a rheostat 43. A brake 45 is arranged to releasably lock the mandrel.

At the beginning of the winding operation the brake is locked, and the strip material 5 is threaded onto the stationary mandrel, for example at a slot 12 provided for that purpose. With the motor 15 turning at rated speed, the generator 30 is driven at the same speed. The winding operation is commenced by unlocking the brake 45, the material delivering device 6 being simultaneously set into operation by conventional mechanism linked to the brake release lever, not shown.

To the shaft 9, or to another shaft mechanically coupled thereto, there is fixed the armature 51 of an index magnet generally indicated at 50. The armature possesses poles 52 which are designed to fit the gap 49 of a field structure 53. The poles 54 of the field structure are connected through a magnetic yoke 55 which carries a winding 56 designed to produce, when energized, a magnetic field across the gap between the poles 54. The winding 56 is connected to contacts on the switch 7 so that the generator voltage may be applied to the winding 56. When the winding 56 is energized, the field between the gap 49 tends to align the armature member 51 parallel thereto. Thus if the mandrel is rotating at low speed when the winding 56 is energized, the mandrel will be brought to a stop in one of the two positions for which the armature 51 is aligned with the gap between the poles 54.

When the roll on the mandrel is completed, the strip material 5 having been wound up into a roll of sufficient diameter, and it is desired to stop the mandrel, the generator armature voltage is thrown from the load resistance 40 to the winding 56 by means of the switch 7. The mandrel at the same time is slowed down by means of the brake 45. Slowing down of the mandrel enforces a corresponding increase in the speed of rotation of the generator so that its output voltage rises and strengthens the locking field between the poles 54 of the index magnet. If preferred, the energization of the winding 56 may be delayed until the brake has reduced the speed of the mandrel to a low value, for example by means of a suitable velocity-operated switch on the shaft 9 inserted in series with the winding 56, the switch being designed to close only at low speeds of rotation of the shaft 9.

It is not essential that the index magnet winding 56 be energized by the output of the generator; any suitable source of electric energy may be employed in its place. In such case however it is desirable to disconnect the load 40 from the generator 30 (or, preferably, to de-energize the drive motor 15, by means of a switch inserted in the supply lines 23), at the time that the brake is applied, so as to reduce the torque at the mandrel which must be overcome by the brake.

If alternating current is applied to the index magnet, the core of the field structure 53 should be laminated in a well known manner to avoid eddy current losses, and should be provided with a shading coil or coils to prevent the flux from falling to zero at the alternations of the impressed voltage.

Fig. 2 illustrates the winding machine of Fig. 1 but with a modified means for braking the mandrel. A substantially constant speed motor 60 is coupled to the member of the drive motor 15 which drives the generator 30. Energization of the motor 60 from mains 61 is controlled by a switch 62. In the figure a direct connection is shown to the shaft of the generator armature; other forms of mechanical coupling may of course be substituted. It is likewise immaterial here, as in the embodiment of Fig. 1, which of the field and armature elements of the motor 15 is coupled to the mandrel and which is coupled to the generator.

The rated speed of the decelerating motor 60 is so chosen with reference to the rated speed of the drive motor 15 and the speed ratio of the transmission between them, that when the motor 60 turns at rated speed, the element of the drive motor 15 which is coupled to the mandrel will be stationary. That is to say, the decelerating motor 60 will drive relative to the base 19 the member of the drive motor 15 to which it is coupled at the rated speed of the motor 15 and in the sense of rotation relative to the base which the drive motor itself imparts to that member.

During the winding of the strip material 5 on the mandrel, the decelerating motor 60 is disconnected by switch 62 from its source of power so that it rotates idly at the speed imposed on the generator 30 by the rate of delivery of the strip material 5 and by the instantaneous diameter of the roll formed by the material on the mandrel. This rate of speed is below the rated speed of the motor 60 by the rate of rotation of the member of the motor 15 coupled to the mandrel multiplied by the gear ratio between the motor 60 and the motor 15.

When the roll on the mandrel is completed and it is desired to bring the mandrel to a stop, the decelerating motor 60 is energized. It quickly brings the member of the drive motor 15 to which it is coupled (in the example shown, the armature 18) into rotation with respect to the base 19 at the rate of speed of the motor 15. Accordingly, the member coupled to the mandrel comes to rest with respect to the base 19. Energization of the index magnet 50, at or after the energization of the decelerating motor, will then cause the mandrel to stop in one of the two preferred positions in which the index magnet armature 51 is aligned with the poles 54 of the field structure.

We claim:

1. In a winding machine, a base, a winding mandrel mounted for rotation with respect to the base, a substantially constant speed motor having a field member and an armature member both rotatably mounted with respect to the base, a coupling between one of said members and the mandrel, a generator, a coupling between the other of the said members and the generator armature, an indexing armature coupled to the mandrel, a field structure adapted when energized to establish a field in the vicinity of said indexing armature, and means to energize said field structure.

2. In a winding machine, a base, a mandrel mounted for rotation with respect to the base, a first substantially constant speed motor having a field member and an armature member, said field and armature members being mounted for rotation with respect to the base and with respect to each other, a first coupling between one of the said members and the mandrel, a generator having a field affixed to the base and an armature mounted for rotation with respect thereto, a second coupling between the generator armature and the other of said members, a second substantially constant speed motor, a third coupling between the second motor and the other of said members, said second motor being adapted through said third coupling to rotate the said other member in the direction in which it is urged by the first motor and at an angular speed relative to the base substantially equal to the rated speed of the first motor, an indexing armature coupled to the mandrel for rotation therewith, a field producing member disposed in position to generate a field in the region of the indexing armature, and means to simultaneously engage the second motor and to shift the generator output from a dissipating means to said field producing member.

3. In a winding machine, a base, a mandrel mounted for rotation with respect to the base, a first substantially constant speed motor having a field member and an armature member, said field and armature members being mounted for rotation with respect to the base and with respect to each other, a coupling between one of the said members and the mandrel, a generator having a field affixed to the base and an armature mounted for rotation with respect thereto, a coupling between the generator armature and the other of said members, a second substantially constant speed motor, a coupling between the second motor and the said second member, said last-named coupling being adapted to rotate said other member in the direction in which it is urged by the first motor and at an angular speed relative to the base substantially equal to the rated speed of the first motor when the second motor is energized, an indexing armature coupled to the mandrel for rotation therewith, a field producing member disposed in position to generate a field in the region of the indexing armature, and means to simultaneously energize the second motor and said field producing member.

4. In a winding machine, a base, a winding mandrel mounted for rotation with respect to the base, a substantially constant speed motor having a field member and an armature member both rotatably mounted with respect to the base, a coupling between one of said members and the mandrel, a generator, a coupling between the other of the said members and the generator, and a decelerating motor coupled to the other of said members, said decelerating motor having such rated speed as to rotate the said second member relative to the base at the rated speed of said constant speed motor.

5. In a winding machine, a base, a winding mandrel mounted for rotation with respect to the base, a substantially constant speed motor having a field member and an armature member both rotatably mounted with respect to the base, a coupling between one of said members and the mandrel, a generator, a coupling between the other of the said members and the generator, an indexing armature coupled to the mandrel for rotation therewith, a field producing structure having a pair of poles disposed about the path of rotation of the indexing armature and between which appears a magnetic field when the said field structure is energized, means to energize the field structure, and a brake adapted to slow down rotation of the mandrel.

6. In a winding machine, a base, a winding mandrel mounted for rotation with respect to the base, a substantially constant speed motor having a field member and an armature member both rotatably mounted with respect to the base, a coupling between one of said members and the mandrel, a generator, a coupling between the other of the said members and the generator, an indexing armature coupled to the mandrel, a field structure adapted when energized to establish a magnetic field in the vicinity of the indexing armature, means to energize the field structure, and a brake adapted to halt rotation of the mandrel.

7. In a winding machine, a base, a winding mandrel mounted for rotation with respect to the base, a substantially constant speed motor having a field member and an armature member both rotatably mounted with respect to the base, a coupling between one of said members and the mandrel, a generator, a dissipating means adapted to be connected to the generator as a load, a coupling between the other of the said members and the generator, an indexing armature coupled to the mandrel, a field structure adapted when energized to establish a field in the vicinity of said indexing armature, and means to connect said field structure to the generator as a load in place of the dissipating means.

GEORGE CAWLEY.
HOWARD M. BROWN.

No references cited.